(12) United States Patent
Mazzei et al.

(10) Patent No.: US 12,240,346 B2
(45) Date of Patent: Mar. 4, 2025

(54) BATTERY DISPLAYS FOR ELECTRIC ROTORCRAFT

(71) Applicant: Bell Textron Inc., Fort Worth, TX (US)

(72) Inventors: Albert Mazzei, Weatherford, TX (US); Michael R. Hull, Fort Worth, TX (US); Yue Fan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 689 days.

(21) Appl. No.: 17/561,900

(22) Filed: Dec. 24, 2021

(65) Prior Publication Data

US 2023/0202321 A1 Jun. 29, 2023

(51) Int. Cl.
*B60L 53/30* (2019.01)
*B60L 53/66* (2019.01)
*B64U 50/19* (2023.01)

(52) U.S. Cl.
CPC ............. *B60L 53/305* (2019.02); *B60L 53/66* (2019.02); *B64U 50/19* (2023.01)

(58) Field of Classification Search
CPC .... B60L 53/305; B60L 53/66; B60L 2260/52; B60L 58/16; B64U 50/34
See application file for complete search history.

(56) References Cited

U.S. PATENT DOCUMENTS

| 3,612,837 | A * | 10/1971 | Brandau | G06G 7/70 |
| | | | | 701/123 |
| 9,764,837 | B2 * | 9/2017 | Phan | B64F 3/02 |
| 10,739,793 | B2 * | 8/2020 | Fisher | G01C 21/18 |
| 2023/0023619 | A1 * | 1/2023 | Fan | B60L 58/12 |
| 2023/0058524 | A1 * | 2/2023 | Fan | B60L 58/13 |

* cited by examiner

*Primary Examiner* — Richard V Muralidar
(74) *Attorney, Agent, or Firm* — Akona IP PC (57) ABSTRACT

There is disclosed in one example, one or more tangible, non-transitory computer-readable storage media having stored thereon machine-executable instructions to: receive battery data from at least one sensor connected to a battery bank of an electric vertical takeoff and landing (eVTOL) aircraft, wherein the battery bank comprises a plurality of batteries; compute from the battery data an available flight time remaining for the eVTOL aircraft; compute a nominal flight time remaining, wherein the nominal flight time remaining excludes a reserve flight time; and display the nominal flight time remaining to a pilot in a human-readable format.

20 Claims, 6 Drawing Sheets

BATTERY DISPLAYS FOR ELECTRIC ROTORCRAFT

TECHNICAL FIELD

This disclosure relates generally to rotary aircraft, and more particularly, though not exclusively to a system and method of providing battery displays for an electric rotorcraft.

BACKGROUND

Electric vertical takeoff and landing (eVTOL) aircraft, or rotorcraft, may be powered by a battery or a bank of batteries.

SUMMARY

There is disclosed in one example, one or more tangible, non-transitory computer-readable storage media having stored thereon machine-executable instructions to: receive battery data from at least one sensor connected to a battery bank of an electric vertical takeoff and landing (eVTOL) aircraft, wherein the battery bank comprises a plurality of batteries; compute from the battery data an available flight time remaining for the eVTOL aircraft; compute a nominal flight time remaining, wherein the nominal flight time remaining excludes a reserve flight time; and display the nominal flight time remaining to a pilot in a human-readable format

BRIEF DESCRIPTION OF THE DRAWINGS

To provide a more complete understanding of the present disclosure and features and advantages thereof, reference is made to the following description, taken in conjunction with the accompanying FIGURES, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the present specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this specification, the terms "forward," "aft," "inboard," and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect (s). The term "inboard" may refer to a location of a component that is within the fuselage of an aircraft and/or a spatial direction that is closer to or along a centerline of the aircraft relative to another component or component aspect (s), wherein the centerline runs in a between the front and the rear of the aircraft. The term "outboard" may refer to a location of a component that is outside the fuselage of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed.

Overview

Unlike fixed-wing aircraft, vertical takeoff and landing ("VTOL") aircraft do not require runways. Instead, VTOL aircraft can take off, hover, and land vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tail-sitter." As the name implies, a tail-sitter takes off and lands on its tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller.

Aircraft are generally used for high-speed direct transport of passengers and/or cargo. Uneven loading of such passengers and/or cargo can affect the center of gravity ("CG") of an aircraft, which may affect flight characteristics and performance of the aircraft. Fixed-wing aircraft offer advantages over rotorcraft in that they are capable of longer range and more efficient flight. In contrast, rotorcraft have the distinct advantage of vertical takeoff and landing, hover, sideward, rearward, and forward flight, which allows for precise landing in space-restricted or otherwise obstructed landing zones in addition to precise maneuvering to and from such landing zones. Tiltrotors and tail-sitters enjoy the advantages of both fixed-wing aircraft and rotorcraft; however, they are especially sensitive to changes in weight and CG.

Electric aircraft have in the past been essentially the domain of small radio-controlled (RC) models or toys, or relatively small drones such as quad copters. These electric vehicles are often characterized by short ranges and short flight times. Such aircraft are often remotely controlled by a ground-based operator, and rarely travel far from the operator.

However recent innovations in battery design have made it practical for larger aircraft to operate electrically. For example, some types of eVTOL aircraft have recently become commercially viable, either as autonomous delivery drones, or as human-piloted or autonomous air taxis. An air taxi may be used for relatively short flights compared to large commercial flights but may still provide a faster option than ground-based transportation. Air taxis may also provide high flexibility in departures and destinations because VTOL aircraft have few infrastructure requirements for takeoff and landing. In essence, a VTOL aircraft can take off or land from any area with suitably firm ground and a clear approach. Thus, air taxis are becoming a viable option for "short hop" flights in which one or more passengers desire quick transport to a location within the range of the air taxi. Advantageously eVTOL aircraft are generally smaller, lighter, less noisy, less polluting than larger rotary aircraft that operate on petrochemical fuels such as jet fuel. The marginal cost of a single flight of an eVTOL aircraft may also be less, as the flight does not consume expensive jet fuel, but merely requires standard electrical power to recharge the battery.

One challenge in the transition from petrochemical fuels to electric power is pilot displays. Pilot displays may provide important safety and operational information for a flight. In a traditional aircraft powered by a petrochemical engine, the flight display may provide the pilot with an indication of the current fuel usage or fuel flow rate (e.g., pounds per hours), as well as the total pounds or gallons of fuel remaining. The fuel gauge may also provide a useful indication such as a gradated display that illustrates an approximate proportion of the fuel remaining between full and empty. Such gradated displays may be familiar to any user who operates an ordinary ground-based vehicle, in which the fuel gauge provides such gradations either mechanically or electronically.

However providing such a gradated display for a battery powered aircraft may not be as straightforward as measuring the estimated pounds of fuel remaining and displaying that relative to the total capacity of the fuel tank. For example, in an EVTOL aircraft rather than a single battery, a bank of batteries may be provided for both extended operation time and for redundancy. Thus, if one battery fails, other batteries may be able to take over operation to continue ensuring a safe flight. In one illustrative example, an air taxi eVTOL aircraft has a bank of six main batteries that provide the motive power for its flight systems. Electric motors may draw power from the battery bank as a whole and use the power to drive rotors that provide lift or (in a tiltrotor configuration) can be tilted to provide forward motion.

The complexity of such a battery system may drive complexity of the display software. For example, it may be possible to display individual battery sensors for each battery in the bank, so that the pilot can see the estimated charge left on each battery, and may be able to see the relative charge remaining relative to a full charge. However such a display can be confusing and cumbersome for the pilot. A pilot making split-second flight decisions may prefer to have a single unitary display like the fuel gauge on a traditional aircraft. Furthermore, it may be in the pilot's interest to be freed from having to make calculations or estimations based on a multifactor battery display. Rather, the pilot may essentially be interested in the question of how much battery energy is available to the aircraft overall, and how long the aircraft can continue operating under current or predicted flight conditions.

Another complication may arise with respect to battery reserve. For example some regulatory or statutory schemes may require the aircraft to maintain a safety reserve in addition to the normal operational power. It may be necessary to maintain enough battery charge to operate for approximately 20 to 30 minutes to comply with regulatory or statutory schemes. This reserve may serve non-regulatory functions as well. For example, maintaining a reserve can also help to protect the batteries. Draining a rechargeable battery down to zero or near-zero charge may cause damage to the battery or may degrade its lifecycle. Thus it may be advantageous to maintain each battery at some level above a zero or near-zero charge state. Thus it may be preferable to provide a pilot with the battery display that excludes the reserve battery so that the pilot can be expected to operate the aircraft within the limits of that reserve and without damaging the battery. Furthermore, an understanding of the flight profile and the flight plan may be preferable because different phases of flight draw varying levels of power.

Takeoff is a first example of a phase of flight that demands high-power loads. During takeoff the aircraft is gaining altitude, and thus every increment of gained altitude must overcome the effects of gravity (e.g., mgh, where h is, by definition, increasing for takeoff). In some cases when the aircraft operates close to the ground, so-called ground effects may also come into play such as by the rotor wash reflecting off the ground. However in some modern eVTOL aircraft such as an air taxi, the rotors may be substantially smaller than those of a traditional helicopter. Thus the ground effect from these rotors may be relatively negligible.

Forward flight continues to draw power, although it may draw less power than takeoff depending on the forward velocity. During forward flight, the aircraft is competing with wind resistance for forward momentum. The energy draw to maintain forward momentum is generally considered to scale with the square of the forward velocity $$\text{(e.g., } \frac{1}{2}mv^2\text{).}$$

However at the speeds generally anticipated for air taxi operation, forward flight is a relatively low energy phase of operation.

Hover may be a relatively higher-energy phase of operation, although less energy demanding than takeoff. In hover, the aircraft may not be gaining altitude, but is resisting the force of gravity to maintain altitude (e.g., F=mg).

Finally, landing may present a particular challenge because the landing maneuver is a modified form of hovering. The landing maneuver may need to control the aircraft so that it descends at a comfortable rate and so that it lands safely without damaging the aircraft or injuring the occupants. Although less energetic than takeoff, landing is still one of the most energetic phases of flight, and presents an additional challenge because it occurs at the end of flight, when the state of charge (SoC) on the battery is substantially lower than at takeoff. The energetic landing maneuver may require a transient current draw that is greater than was required in previous phases of flight, when the battery SoC was better. This leads to a "spike" in power delivery at the end of flight, which requires understanding the flight plan and profile well enough to ensure that the battery SoC is maintained to a level wherein the battery will be able to deliver the necessary power spike.

In some traditional rotary aircraft such as helicopters, even if the aircraft is critically low on fuel a skilled pilot may be able to use an auto rotate maneuver to safely land the aircraft when power is lost or nearly lost. However in at least some examples of an air taxi, the rotors are substantially smaller than in a traditional helicopter and may not be able to support the auto rotate maneuver. Thus in some cases if battery power fails, it may be very difficult for the pilot to safely land the aircraft. This again leads to the requirement for maintaining certain reserves, and for onboard computers to be aware of the flight profile and the flight plan so that sufficient energy can be reserved to support the landing maneuver, preferably without dipping into the regulatory reserve or damaging the aircraft battery.

Embodiments disclosed herein provide an aggregated and unitary aircraft battery display that provides a pilot with sufficient information to make informed decisions about flight operations, while not overwhelming the pilot with unnecessary information. For example in an embodiment a single battery display provides a single SoC indication, similar to the single fuel gauge provided on a traditional aircraft. The single battery display may illustrate the overall state of charge of the battery bank and thus indicate the overall power available to continue operating the aircraft. This display may be computed by measuring information about the batteries, such as the terminal voltage, the output current, the operating temperature, and other factors that may affect the operation or that that may affect the ability of the battery to deliver charge. Furthermore, the display may account for the state of health of the batteries, which may be known before flight, and may also account for failures or irregularities. For example if one battery fails, or experiences a degradation in performance, then the system may observe that other batteries are providing much higher current than the failed or degraded battery. The system may then infer that the failed or degraded battery cannot be relied upon to continue providing power to the system. Thus, in computing the available charge for the aircraft the system may exclude batteries that are providing current that is not within a threshold (or a number of standard deviations) of the average current supplied by the other batteries. For example if five of the six batteries are providing a current $i_0$ (within a threshold such as 10% or 25% of one another), and a sixth battery is providing a current $i_1$ that is substantially less (e.g. that deviates more than 10 or 25% from the other batteries), then the system may infer that the latter battery is faulty. Thus the battery should not be relied on to continue providing power and may be excluded from computations.

In performing computations, the system may also account for landing maneuvers, such as by anticipating the power draw acquired to land according to the programmed flight plan. It may also compute a worst-case power draw requirement, such as by computing the power needed to land at the greater of the current altitude or the planned altitude at the landing maneuver. Thus a battery display may include a marker or a line that indicates to the pilot where the battery will be drained down to a level that leaves only approximately enough power to safely complete the landing maneuver. Furthermore, in at least some embodiments the battery percentage or flight time remaining may exclude battery required for to maintain a statutory or regulatory reserve. For example if the regulatory reserve is 25 minutes, then when the battery reads "0%" this may actually indicate that an estimated 25 minutes of flight time is remaining for the aircraft. It may be preferable for the aircraft not to dip into this reserve time, not only because of the statutory or regulatory requirements, but also because dipping into the reserve battery power may draw the batteries dangerously close to zero, and may thus damage the batteries either instantaneously or at least degrade their long-term health. However, it is recognized that emergency battery reserve is provided for purposes of safety, and if unexpected conditions occur or the pilot is forced to go into the reserve battery power, it is generally preferable to protect the occupants of the aircraft over the health of the battery. Thus once the pilot has exhausted the normal flight battery power and dipped into the reserve power, the display may switch over to displaying the actual final charge remaining on the battery. In this case the pilot will have a firmer indication of how much power is available to safely land the aircraft before catastrophic failure may occur.

In yet other embodiments the battery display software may be aware of the planned flight profile, and may be able to detect different phases of flight. For example, different phases of flight may be inferred from altitude, changes in altitude, and/or airspeed. In the case of a tilt rotor, phases of flight may also be inferred from the position of the rotors (i.e., the rotors are expected to be in a vertical orientation during takeoff, landing, and hover, and in a horizontal orientation during cruise or airplane mode).

It is recognized that in real-world conditions the flight profile may not always match the flight plan. The aircraft may encounter turbulence, disturbances, unexpected conditions, unplanned component failure, weather, damage, obstructions, or other conditions that may force a change the flight plan. Thus in one example the pilot may be provided with a display that shows convergence or divergence between the current flight profile and the flight plan. For example the system may be able to detect different phases of flight such as takeoff, cruise, hover, or land. The system may also measure the current load or rate of drain on the battery, and anticipate the power demands for future portions of the flight profile. The pilot may be warned if the current flight profile diverges significantly from the plant flight plan, and in particular if the flight profile jeopardizes the ability of the aircraft to safely complete the flight plan. In one example, pilots may be familiar with the protocol of "land as soon as practical" versus "land as soon as possible." Land as soon as practical may indicate that there is a danger of running out of energy in the batteries before the end of the flight profile, and so the pilot should seek a safe landing as soon as practical. Land as soon as possible on the other hand may indicate that there is a danger of catastrophic failure and loss of power if the pilot does not land the aircraft as soon as genuinely possible.

In one example, an indicator or a marker may be provided on the battery display with a "land as soon as possible" or LAAPo. If the pilot reaches the LAAPo line, this may be an indication that the aircraft is in danger of reaching or of exhausting the available power above the safety margin or reserve threshold. As before, the LAAPo line may exclude the statutory or regulatory reserve that is provided as a last-chance safety measure, and that also may result in damage or degradation to the battery. In some cases, the LAAPo line may move as the pilot executes different maneuvers, and as the rate of drain on the battery changes.

If the battery bank expends all of the nominal energy, and the aircraft is forced to operate on the reserve power, the battery display may adjust to indicate the percentage of reserve power remaining. In that case, the "flight time remaining" indicator may change from indicating estimated flight time before the reserve is reached, to estimating remaining flight time before true catastrophic failure.

One object of the battery display may be to help the pilot operate the aircraft safely within its design parameters, without causing damage to the aircraft or the batteries. Another object may be to provide the pilot with sufficient information that in the case of an unexpected event, where the pilot is forced to dip into the reserves of the battery, that the pilot may determine how much flight time remains before true catastrophic failure. In both cases, the "estimated flight time remaining" may exclude the estimated energy to complete a landing maneuver, which as discussed above may require an increase in power delivery relative to flight phases that precede landing.

DESCRIPTION OF THE DRAWINGS

A system and method for providing battery displays of an electric aircraft battery system will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

Figure 1:
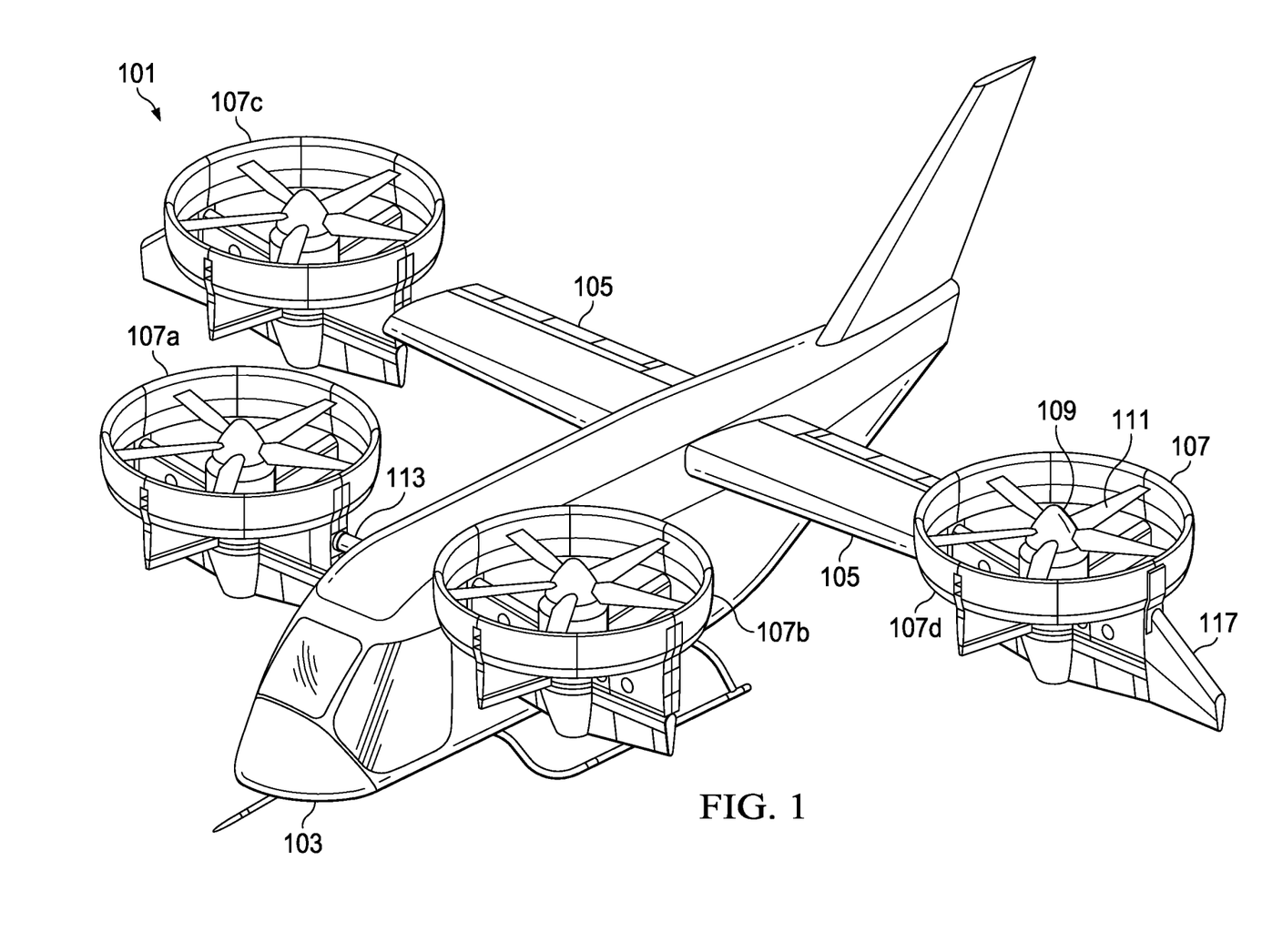
FIG. 1 is an oblique view of an aircraft configured for operation in a helicopter flight mode in accordance with embodiments described herein.
Figure 2:
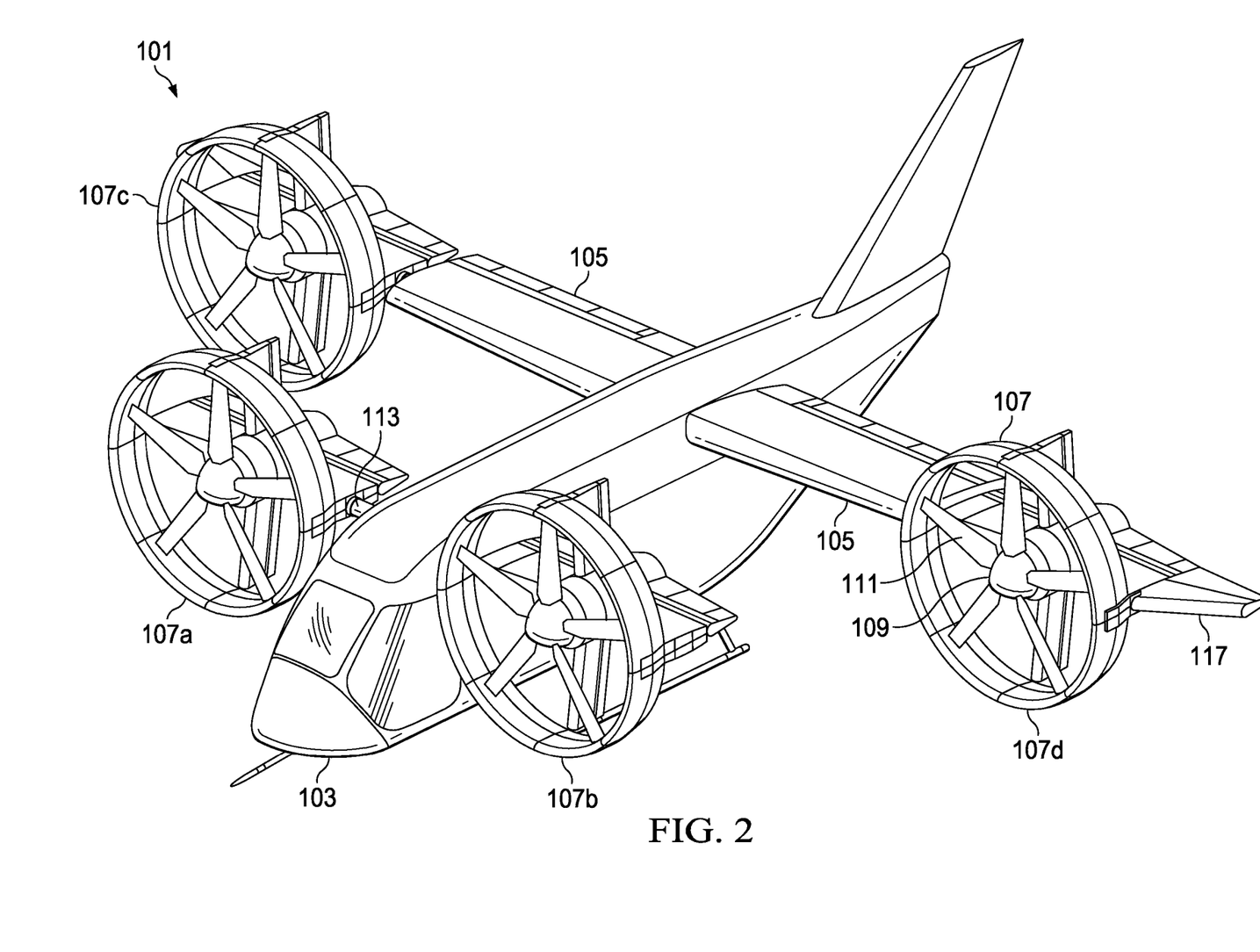
FIG. 2 is an oblique view of the aircraft of FIG. 1 configured for operation in an airplane flight mode in accordance with embodiments described herein.

FIGS. 1 and 2 are oblique views of a ducted-rotor aircraft 101 in a tiltrotor configuration. Aircraft 101 may be, for example, an "air taxi" that may be used to ferry passengers, or may be configured for cargo, sightseeing, research, or other uses. Aircraft 100 may be a purely mechanical aircraft, a purely electrical aircraft, or a hybrid electric aircraft, by way of illustrative example.

Aircraft 101 comprises a fuselage 103 with a fixed wing 105 that extends therefrom and a plurality of rotatable ducts 107. Each duct 107 houses a power plant for driving an attached rotor 109 in rotation. The power plant may be, by way of illustration, a mechanical engine, an electric motor, or other drive means. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each independently coupled to a corresponding end of wing 105 via a respective spindle 113. As shown, each of ducts 107c and 107d each include a winglet 117 that is coupled thereto. It should be appreciated that aircraft 101 is not limited to the illustrated configuration having four ducts 107, and that aircraft 101 may alternatively be implemented with more or fewer ducts 107.

FIG. 2 illustrates the same aircraft 101 in an airplane configuration. In this configuration, ducts 107 are oriented in a horizontal pitch, which provides greater forward thrust at the expense of hover capability. In an illustrative operation, aircraft 101 may begin in helicopter mode for takeoff (as illustrated in FIG. 1), convert to airplane mode for cruise (as illustrated in FIG. 2), and then revert to helicopter mode for vertical landing. Alternatively, if sufficient runway length is available, aircraft 101 may operate exclusively in airplane mode. In another example, for example a short flight with a heavy or less stable payload, aircraft 100 may operate exclusively in helicopter mode.

Figure 3:
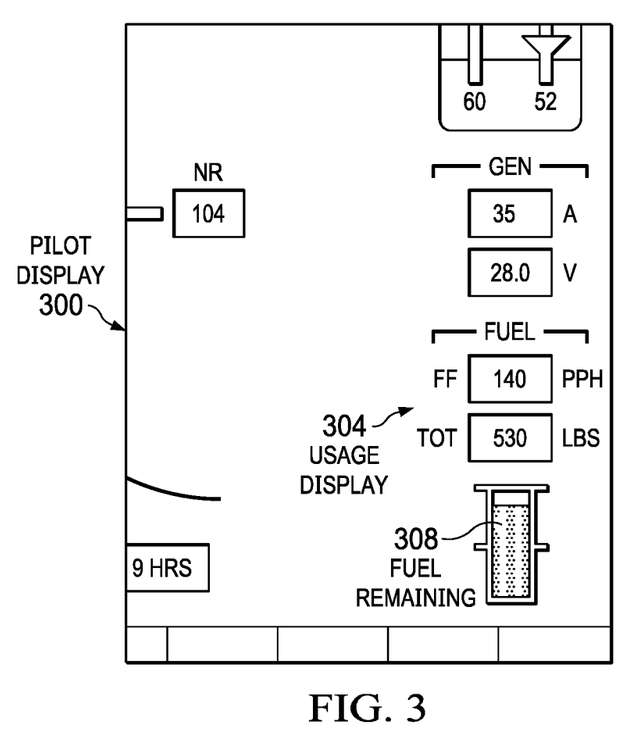
FIG. 3 is a block diagram of selected elements of a pilot display in accordance with embodiments described herein.

FIG. 3 is a block diagram illustration of a pilot display 300. Pilot display 300 may include traditional information that is used by the pilot including for example a fuel usage display 304 and a fuel remaining display 308. Usage display 304 may illustrate for example the current fuel flow rate in pounds per hours, and the total fuel remaining in pounds. Pilot display 300 also includes a gradated fuel gauge 308 which illustrates visually the fuel remaining.

Using the information on this display, a pilot may traditionally estimate the flight time remaining for the aircraft based on the fuel quantity and the fuel flow. For example, if the pilot has 530 pounds of fuel and is using 140 pounds per hour, the pilot may estimate that the aircraft may fly for a little more than 3.5 hours before exhausting its fuel. Note that this is based on the assumption that the fuel flow will continue to be 140 pounds per hour. If the pilot operates the aircraft in a way that substantially increases or decreases the fuel flow, then the time remaining may also be affected.

A fuel remaining indicator may be of limited use to a pilot of a of a purely electric aircraft. However, pilot display 300 is not entirely irrelevant to the present disclosure. For example in some cases a hybrid electric configuration is used for aircraft. In a hybrid electric configuration, a mechanical engine that burns traditional aircraft fuel may be used to power an electric generator. The electric generator may then distribute power to the aircraft, including to one or more motors that turn the rotors of the aircraft. Thus even in cases of a hybrid electric aircraft, pilot display 300 may provide useful information to the pilot.

Figure 4:
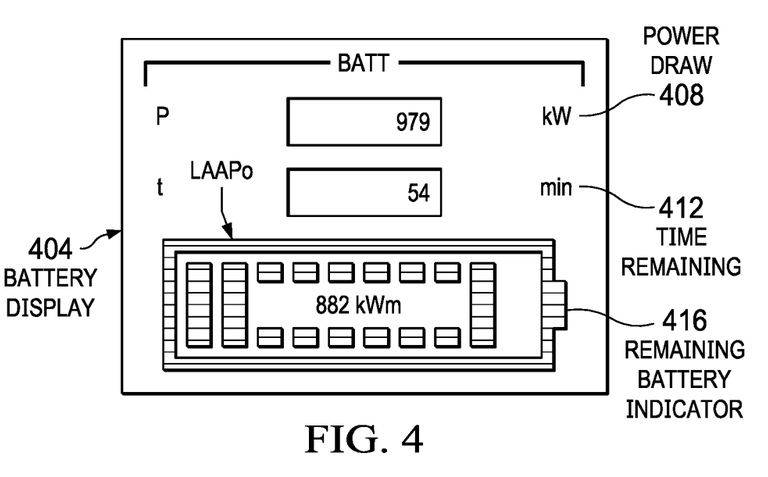
FIG. 4 is a block diagram of selected elements of a battery display in accordance with embodiments described herein.

FIG. 4 is a block diagram illustration of selected elements of a battery display 404. Battery display 404 may be useful in cases where the aircraft is battery-powered, such as in the case of a pure electric aircraft or in a hybrid electric aircraft. Battery display 404 illustrates the current power draw in kilowatts, as well as the estimated flight time remaining in minutes.

Remaining battery indicator 416 may be substantially similar to well-known segmented battery displays that are used on common electronic products. However, rather than displaying information for a single battery, indicator 416 may display composite information derived from a bank of batteries. Remaining battery indicator 416 may also provide a numerical readout of the composite battery charge remaining, in kilowatts minutes or kilowatt hours. Furthermore, remaining battery indicator 416 may not be a direct reading from a single battery, but may be a composite reading estimated from a battery bank, such as a bank of six batteries (or some other number of batteries). This may include accounting for the estimated state of charge of each battery in the bank, as well as determining whether any batteries in the bank have experienced failure conditions or other factors that may affect their ability to continue to deliver power at the expected rate.

Remaining battery indicator 416 also includes a marker labeled LAAPo. The LAAPo marker indicates a point at which the aircraft has remaining battery power, but the pilot is encouraged to land as soon as possible to continue operating the aircraft safely. Thus the LAAPo marker may indicate the battery remaining until the pilot is encouraged to initiate a landing maneuver to safely land the aircraft without exhausting the battery or dipping into the statutory or regulatory safety reserve. Advantageously, remaining time indicator 412 and battery remaining indicator 416 may account for a preprogrammed mission profile or an anticipated flight plan. Furthermore, they may exclude estimated state of charge (SoC) required for a landing maneuver, and may also exclude a statutory reserve. In some cases, one or more reserve batteries may be provided, such as a landing battery and/or a reserve battery. For example, the landing battery may be provide a "boost" of power (such as extra current) for the landing maneuver, and a reserve battery may be configured to provide enough power for the statutory or regulator reserve operating time (such as 15 minutes, 20 minutes, 25 minutes, 30 minutes, or sometime between 10 and 35 minutes). The software that drives displays 412, 416 may omit these from its remaining power calculations.

Figure 5:
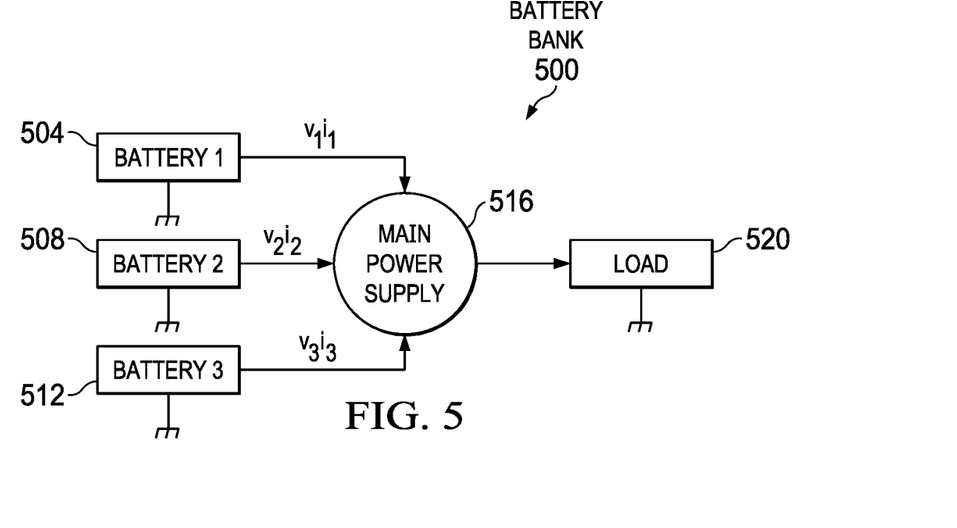
FIG. 5 is a block diagram of selected elements of a battery bank in accordance with embodiments described herein.

FIG. 5 is a block diagram illustration of selected elements of a battery bank 500. Battery bank 500 illustrated here includes three batteries namely battery 1 504, battery 2 508, and battery 3 512. Additional battery configurations may be included, including different parallel and series combinations. In one example of an electric rotorcraft, six batteries are provided in parallel, and are expected to contribute substantially the same amount of power to operation. Three batteries are illustrated here for purposes of simplicity. Furthermore, additional batteries may be provided, such as batteries for support or auxiliary systems, and a reserve or landing battery.

A main power supply 516 draws power from batteries 504, 508, 512. Main power supply 516 may include an ammeter that measures the current being drawn from each battery. For example, battery 1 504 is delivering current $i_1$ one at voltage $v_1$. Battery 2 508 is delivering current $i_2$ at voltage $v_2$. Battery 3 is delivering current $i_3$ at voltage $v_3$.

Main power supply 516 provides the power to a load 520, which may include electrical systems of the rotorcraft including the drive power for the rotors. Main power supply 516 may detect the current supplied by battery, and can determine whether one of the batteries is providing substantially less current than the other batteries. For example, main power supply 516 (or another component, such as a controller) may compute a mean current being supplied by the batteries. The system may also determine whether any batteries within battery bank 500 are providing substantially less power, such as power that deviates from the mean power or current. In an example, a mean, median or mode may be computed as an average, and any battery that deviates from the average may be deemed out of threshold. The threshold may be, for example, 10%, 15%, 20%, 25%, or other. In another example, an average may be computed, and any battery that deviates by a number of standard deviations such as one standard deviation (1σ), two standard deviations (2σ), three standard deviations (3σ), four standard deviations (4σ), or a different number of standard deviations, is considered out of threshold.

If main power supply 516 determines that a battery within battery bank 500 is providing substantially less power, or alternatively the other batteries are having to provide extra power, then the system may determine that the battery providing less power has a encountered a failure state or a or a failure mode or is in an unexpected state. Thus in computing the total power remaining, the failed or unexpected battery may be omitted on the theory that the battery is no longer reliable, and thus cannot be depended upon to continue to providing study power.

Figure 6:
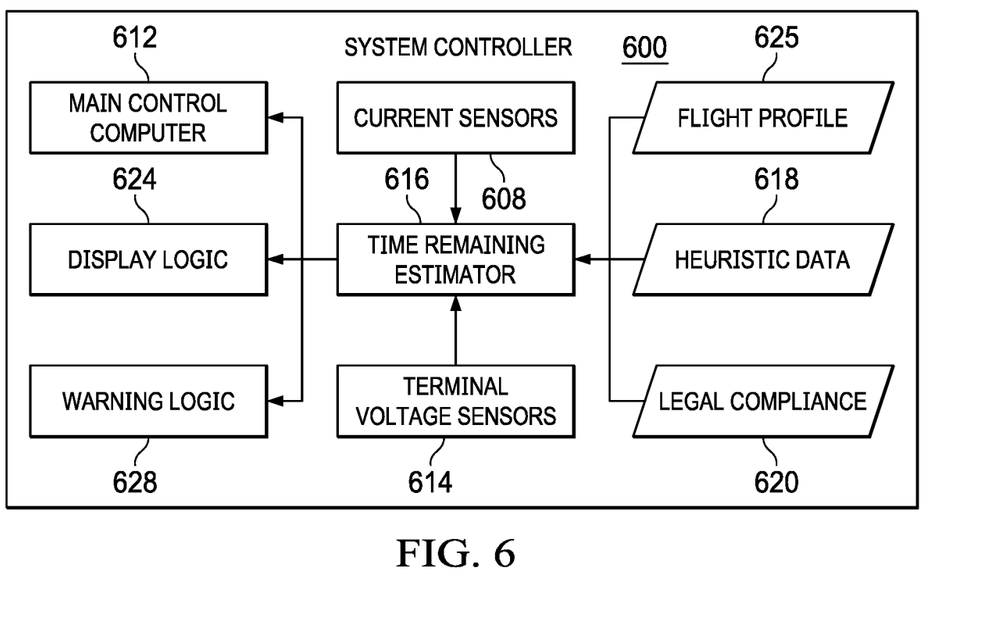
FIG. 6 is a block diagram of selected elements of a system controller in accordance with embodiments described herein.

FIG. 6 is a block diagram of selected elements of a system controller 600. System controller 600 is divided into certain logical blocks, which may be various hardware and/or software components, on one or more physical devices.

System controller 600 includes a main control computer 612, which provides the main control function of the rotorcraft. This may include conditioning pilot inputs (in a semiautonomous mode), or providing autonomous or semiautonomous control for certain phases of flight.

Display logic 624 is provided to display information to the pilot, such as the battery remaining indicator or a time remaining indicator.

Warning logic 628 may be configured to provide warnings at certain thresholds, such as a "land as soon as practical"

(LAAPr) warning (which may be triggered by a determination that the aircraft does not have sufficient energy remaining to complete its intended flight plan), a LAAPo warning (which may be triggered when it is determined that there is only sufficient energy to safely land the aircraft without dipping into the statutory or regulatory reserve), or a warning indicator that the pilot has begun drawing from the statutory or regulatory reserve, and thus is in danger of damaging the aircraft, damaging the battery, or experiencing catastrophic failure if the batteries fail.

A time remaining estimator 616 provides information to main control computer 612, display logic 624, and warning logic 628. Time remaining estimator 616 may include current sensors 608 such as ammeters connected in series with the various batteries to sense how much current each battery is currently supplying. Terminal voltage sensor 614 may also be provided in parallel to the batteries to determine the terminal voltages of the batteries. Over time as a rechargeable battery loses charge, the terminal voltage drops, and the battery's peak current for a given load impedance also drop. Thus, in some cases the remaining charge can be estimated from the terminal voltage and/or the current provided.

Time remaining estimator 616 may also account for a flight profile 625, heuristic data 618, and legal compliance data 620. Flight profile 625 may account for the flight plan, the planned altitude, the planned maneuvers, known weather conditions, or other information that may affect flight. These different conditions may require more or less transient draw on the battery, and thus time remaining estimator 616 can account for these transient power demands in estimating the flight time available.

Heuristic data 618 may include empirical data and scenarios that may be used to estimate future operating conditions. This may include aircraft characteristics, past flight conditions, past power requirements, and other factors as compared to current flight conditions.

Legal compliance 620 may include information about regulatory or statutory schemes that require the aircraft to operate within certain parameters, which may affect the power draw or the estimate of the power remaining. For example, the aircraft may have limitations on where, when, how fast, how high, or how low it can fly. There may also be requirements for a statutory or regulatory battery reserve.

Figure 7:
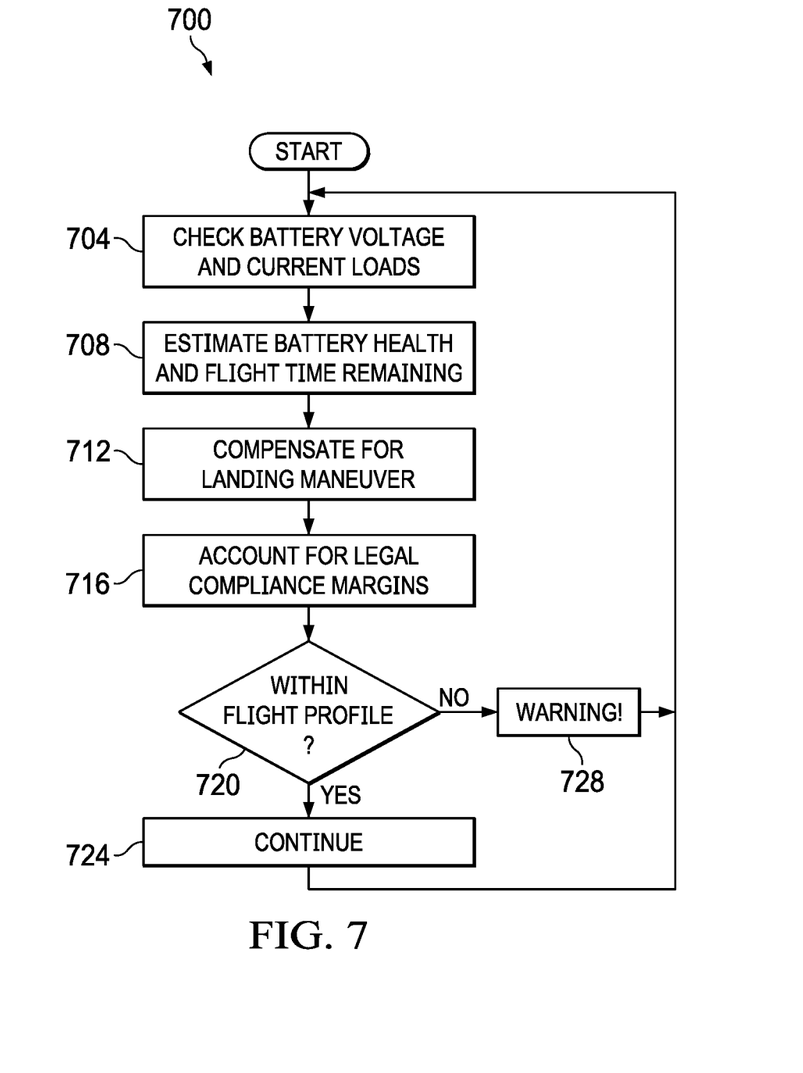
FIG. 7 is a flow chart of a method of calculating a nominal battery amount remaining in accordance with embodiments described herein.

FIG. 7 is a flowchart of a method 700 of estimating remaining power within an electric rotorcraft.

Starting in block 704 the control system checks the battery voltage and current loads of the battery or batteries within a battery bank.

In block 708, the system may estimate the battery health, battery state of charge, battery condition, and other information. According to these calculations, the system may estimate total flight time remaining. Depending on whether separate reserve and/or landing batteries are provided, the estimate may include or exclude the reserve power or the power required for the landing maneuver.

In block 712, if necessary the system may account for a landing maneuver that will need to be performed at the end of the flight. As discussed above, and air taxi may have relatively small rotors, and it may thus be very difficult to perform an autorotation. It is therefore of safety concern that the aircraft reach the end of its flight path with sufficient energy to successfully perform the high-energy landing maneuver. Thus the state of charge and associated energy remaining below which cannot support the landing maneuver power draw may be subtracted from the flight time remaining, with the understanding that this extra power will be needed at the end of flight.

In block 716, if necessary the system may also account for legal compliance margins, such as by subtracting from the flight time remaining a statutory or regulatory reserve that the aircraft is required to maintain under normal operating conditions. This reserve may also be selected to prevent damage to the aircraft or to the battery or battery bank, which damage may be caused by drawing the battery down to a zero or near-zero state of charge.

In decision block 720 the system determines whether the current flight profile is within the parameters of the scheduled flight plan. For example the system may determine whether the flight plan can be successfully completed consistent with the current estimated state of charge.

If the flight plan cannot be successfully completed, then in block 728 the pilot may be warned.

Returning to decision block 720, if the flight plan can be successfully completed, then in block 724 the flight continues, and aircraft displays may be updated.

Control may then return back to block 704.

Figure 8:
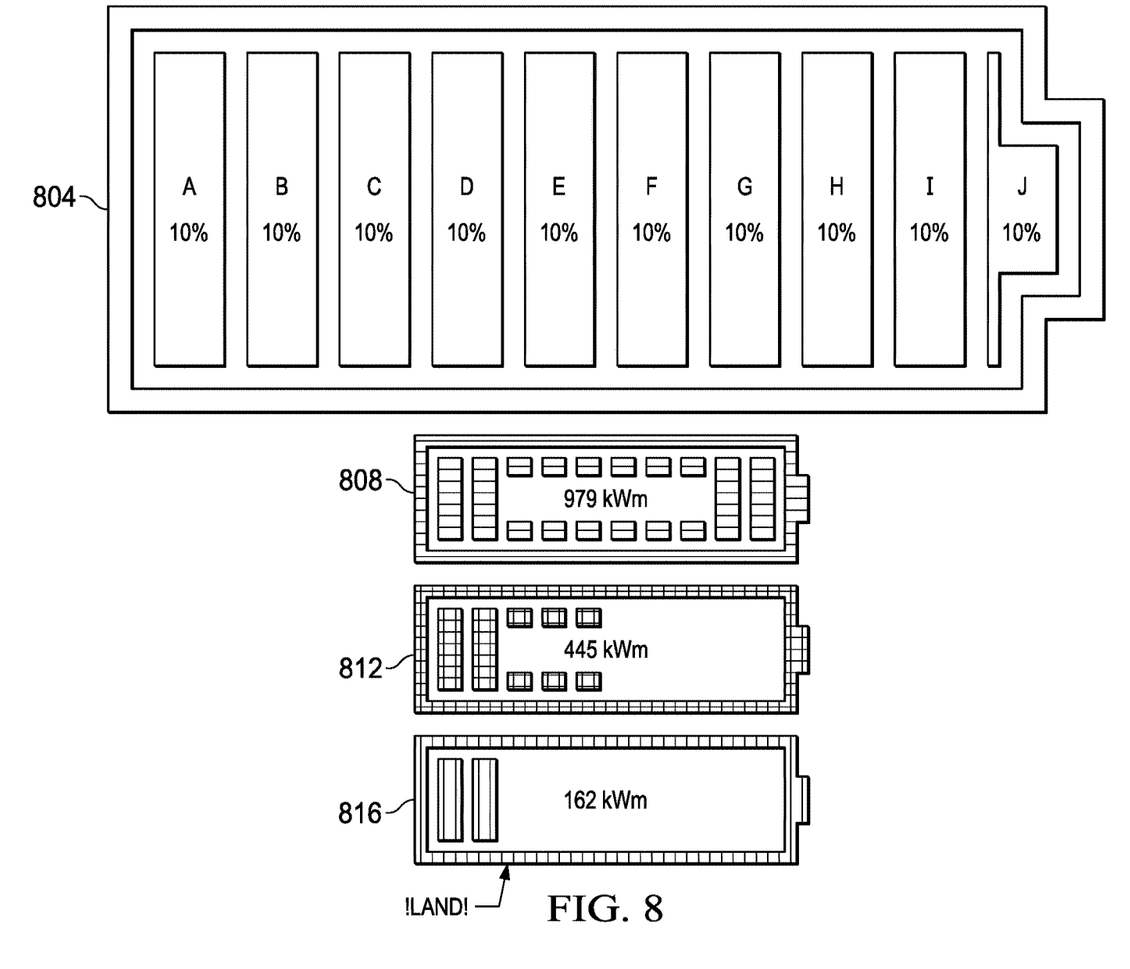
FIG. 8 is a block diagram of selected elements of a segmented battery display in accordance with embodiments described herein.

FIG. 8 is a block diagram illustrating additional details of a battery display regimen. In this illustration, battery display 804 is divided into 10 sections or blocks labeled A through J. Each block represents approximately 10% of the overall composite charge of the battery or battery banks.

To smooth out large variations in the charge over short periods of time, displayed energy hysteresis may be added. For example, each block may be "lit" at greater than 6% of the block, and may be "unlit" at less than 4%. This can help to prevent jitter in the battery display. For example the battery remaining estimator may account for flight maneuvers, wind resistance, aircraft batteries available in the battery bank, and other factors. Without hysteresis, a segment may for example light and unlight at the same percentage. If transient draws are affecting the battery, then a segment may "jitter," quickly toggling between on and off. This may be distracting and unhelpful to the pilot, because relatively minor changes may affect which battery segment is displayed. Thus the use of hysteresis can help to prevent jitter in the display.

Furthermore, three levels of color may be provided as an additional visual cue to the pilot. The color is not visible in the present black and white line drawings, but different colors are indicated by different thatching schemes.

For example, in display 808 979 kW-minutes are left in the battery. The battery is substantially fully charged, and all blocks A through J are lit up. In this case the battery may have a display color such as cyan or green. In an embodiment, if the last block lit is one of blocks G through J, indicating that the batteries are between 70% and 100% composite state of charge, the display may be colored cyan or green.

In display 812, 445 kW-minutes are remaining. This illustrates an intermediate state of charge. In an example, if the last block list is one of blocks D, E, or F, then 40 to 60% of the composite charge remains. In that case, display 812 may be colored yellow or amber.

In display 816, 162 kW-minutes of energy are remaining, and the "LAND!" warning indicator is lit up. If the last block lit is one of blocks A, B, or C, then the composite state of charge is between 0 and 30%. In this case the battery display may be colored red or magenta. If the pilot reaches the LAAPo mark, then a warning such as "LAND!" may be lit, and optionally may flash as a further indicator.

If the pilot reaches the statutory or regulatory reserve, then the display may switch from showing the total SoC to the SoC of the reserve battery (or the percentage remaining of the reserve, if a separate reserve battery is not used). To continue to indicate the criticality of the situation, in that case the full display may be colored red or magenta regardless of what percentage is shown. This indicates to the pilot that the batteries have only the energy displayed before catastrophic failure may occur.

Variations and Ranges

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

SELECTED EXAMPLES

The teachings of the present specification may be understood in terms of various examples, as follows.

There is disclosed in an example, one or more tangible, non-transitory computer-readable storage media having stored thereon machine-executable instructions to: receive battery data from at least one sensor connected to a battery bank of an electric vertical takeoff and landing (eVTOL) aircraft, wherein the battery bank comprises a plurality of batteries; compute from the battery data an available flight time remaining for the eVTOL aircraft; compute a nominal flight time remaining, wherein the nominal flight time remaining excludes a reserve flight time; and display the nominal flight time remaining to a pilot in a human-readable format.

There is also disclosed an example, wherein the instructions are further to display an aggregate battery charge remaining for the batteries of the battery bank.

There is also disclosed an example, wherein the aggregate battery charge remaining comprises a multi-segment display.

There is also disclosed an example, wherein the instructions are to provide per-segment hysteresis for the multi-segment display There is also disclosed an example, wherein segments of the multi-segment display represents approximately 10% of the aggregate battery charge.

There is also disclosed an example, wherein the instructions are to unlight a segment at approximately 4% of the aggregate battery charge represented by the segment, and light the segment at approximately 6% of the aggregate battery charge represented by the segment.

There is also disclosed an example, wherein the instructions are to account for estimated battery health of the batteries.

There is also disclosed an example, wherein the reserve flight time is selected to avoid damaging the batteries by drawing the batteries draining the batteries below a threshold state of charge.

There is also disclosed an example, wherein the reserve flight time is selected to comply with a statutory or regulatory requirement.

The one or more tangible, non-transitory computer-readable media of claim 1, wherein the reserve flight time is between approximately 20 and 35 minutes.

There is also disclosed an example, wherein the instructions are to measure current from the batteries, and if the current from a first battery varies from the current from other batteries of the battery bank above a threshold, infer that the first battery has encountered a failure condition.

There is also disclosed an example, wherein the instructions are to omit the first battery from the nominal flight time remaining.

There is also disclosed an example, wherein computing the available flight time remaining comprises computing the available flight time for a current phase of flight or a current flight profile.

There is also disclosed an example, wherein the instructions are further to compare the nominal flight time remaining to a flight plan, and determine whether the eVTOL aircraft can complete the flight plan.

There is also disclosed an example, wherein the instructions are further to display a convergence or divergence between current flight conditions and the flight plan.

There is also disclosed an example, wherein the instructions are to display a "land as soon as possible" warning if the nominal flight time remaining is substantially zero.

There is also disclosed an example of a method of estimating remaining battery for an electrical vertical takeoff and landing (eVTOL) aircraft, comprising: collecting voltage and current data from a plurality of batteries in a battery bank and disposed to provide flight power for the eVTOL aircraft; computing a reserve energy required to provide a reserve flight time;

computing a flight condition-based total flight time remaining according to the voltage and current data; computing a usable flight time comprising the total flight time less the reserve flight time; and displaying the usable flight time to a pilot of the eVTOL aircraft.

There is also disclosed an example, further comprising displaying an aggregate battery charge remaining for the batteries of the battery bank.

There is also disclosed an example, wherein the aggregate battery charge remaining comprises a multi-segment display.

There is also disclosed an example, further comprising providing per-segment hysteresis for the multi-segment display There is also disclosed an example, wherein segments of the multi-segment display represents approximately 10% of the aggregate battery charge.

There is also disclosed an example, further comprising unlighting a segment at approximately 4% of the aggregate battery charge represented by the segment, and lighting the segment at approximately 6% of the aggregate battery charge represented by the segment.

There is also disclosed an example, further comprising accounting for estimated battery health of the batteries.

There is also disclosed an example, wherein the reserve flight time is selected to avoid damaging the batteries by drawing the batteries draining the batteries below a threshold state of charge.

There is also disclosed an example, wherein the reserve flight time is selected to comply with a statutory or regulatory requirement.

There is also disclosed an example, wherein the reserve flight time is between approximately 20 and 35 minutes.

There is also disclosed an example, further comprising measuring current from the batteries, and if the current from a first battery varies from the current from other batteries of the battery bank above a threshold, inferring that the first battery has encountered a failure condition.

There is also disclosed an example, further comprising omitting the first battery from the usable flight time remaining.

There is also disclosed an example, wherein computing the usable flight time remaining comprises computing the usable flight time for a current phase of flight or a current flight profile.

There is also disclosed an example, further comprising comparing the usable flight time remaining to a flight plan, and determining whether the eVTOL aircraft can complete the flight plan.

There is also disclosed an example, further comprising displaying a convergence or divergence between current flight conditions and the flight plan.

There is also disclosed an example, further comprising displaying a "land as soon as possible" warning if the usable flight time remaining is substantially zero.

There is also disclosed an example of an apparatus comprising means for performing the method.

There is also disclosed an example, wherein the means for performing the method comprise a processor and a memory.

There is also disclosed an example, wherein the memory comprises machine-readable instructions that, when executed, cause the apparatus to perform the method.

There is also disclosed an example, wherein the apparatus is a computing system.

There is also disclosed an example of at least one computer readable medium comprising instructions that, when executed, implement a method or realize an apparatus as described.

There is also disclosed an example of an electric vertical takeoff and landing (eVTOL) aircraft, comprising: a rotary drive system; a power bank to power the rotary drive system, the power bank comprising a plurality of batteries; a pilot display; and a computing apparatus comprising a processor circuit and a memory, the memory having stored thereon instructions to monitor the power bank and compute a contextual nominal flight time remaining, wherein the nominal flight time remaining accounts for an aggregate status of the batteries and for a plurality of flight modes; and to display the nominal flight time remaining on the pilot display.

There is also disclosed an example, wherein the instructions are further to display an aggregate battery charge remaining for the batteries of the power bank.

There is also disclosed an example, wherein the aggregate battery charge remaining comprises a multi-segment display.

There is also disclosed an example, wherein the instructions are to provide per-segment hysteresis for the multi-segment display There is also disclosed an example, wherein segments of the multi-segment display represents approximately 10% of the aggregate battery charge.

There is also disclosed an example, wherein the instructions are to unlight a segment at approximately 4% of the aggregate battery charge represented by the segment, and light the segment at approximately 6% of the aggregate battery charge represented by the segment.

There is also disclosed an example, wherein the instructions are to account for estimated battery health of the batteries.

There is also disclosed an example, wherein the instructions are further to subtract a reserve flight time from the nominal flight time.

There is also disclosed an example, wherein the reserve flight time is selected to avoid damaging the batteries by drawing the batteries draining the batteries below a threshold state of charge.

There is also disclosed an example, wherein the reserve flight time is selected to comply with a statutory or regulatory requirement.

There is also disclosed an example, wherein the reserve flight time is between approximately 20 and 35 minutes.

There is also disclosed an example, wherein the instructions are to measure current from the batteries, and if the current from a first battery varies from the current from other batteries of the power bank above a threshold, infer that the first battery has encountered a failure condition.

There is also disclosed an example, wherein the instructions are to omit the first battery from the nominal flight time remaining.

There is also disclosed an example, wherein computing the nominal flight time remaining comprises computing the nominal flight time for a current phase of flight or a current flight profile.

There is also disclosed an example, wherein the instructions are further to compare the nominal flight time remaining to a flight plan, and determine whether the eVTOL aircraft can complete the flight plan.

There is also disclosed an example, wherein the instructions are further to display a convergence or divergence between current flight conditions and the flight plan.

There is also disclosed an example, wherein the instructions are to display a "land as soon as possible" warning if the nominal flight time remaining is substantially zero.

What is claimed is:

1. One or more tangible, non-transitory computer-readable storage media having stored thereon machine-executable instructions to:
   receive battery data from at least one sensor connected to a battery bank of an electric vertical takeoff and landing (eVTOL) aircraft, wherein the battery bank comprises a plurality of batteries;
   compute from the battery data an available flight time remaining for the eVTOL aircraft;
   compute a nominal flight time remaining, wherein the nominal flight time remaining excludes a reserve flight time; and
   display the nominal flight time remaining to a pilot in a human-readable format.

2. The one or more tangible, non-transitory computer-readable storage media of claim 1, wherein the machine-executable instructions are further to display an aggregate battery charge remaining for the batteries of the battery bank.

3. The one or more tangible, non-transitory computer-readable storage media of claim 2, wherein the aggregate battery charge remaining comprises a multi-segment display.

4. The one or more tangible, non-transitory computer-readable storage media of claim 3, wherein the machine-executable instructions are to provide per-segment hysteresis for the multi-segment display.

5. The one or more tangible, non-transitory computer-readable storage media of claim 4, wherein segments of the multi-segment display represent approximately 10% of the aggregate battery charge.

6. The one or more tangible, non-transitory computer-readable storage media of claim 5, wherein the machine-executable instructions are to unlight a segment at approximately 4% of the aggregate battery charge represented by the segment, and light the segment at approximately 6% of the aggregate battery charge represented by the segment.

7. The one or more tangible, non-transitory computer-readable storage media of claim 1, wherein the machine-executable instructions are to measure current from the batteries, and if the current from a first battery varies from the current from other batteries of the battery bank above a threshold, infer that the first battery has encountered a failure condition.

8. The one or more tangible, non-transitory computer-readable storage media of claim 7, wherein the machine-executable instructions are to omit the first battery from the nominal flight time remaining.

9. The one or more tangible, non-transitory computer-readable storage media of claim 1, wherein computing the available flight time remaining comprises computing the available flight time for a current phase of flight or a current flight profile.

10. The one or more tangible, non-transitory computer-readable storage media of claim 1, wherein the machine-executable instructions are further to compare the nominal flight time remaining to a flight plan and determine whether the eVTOL aircraft can complete the flight plan.

11. The one or more tangible, non-transitory computer-readable storage media of claim 10, wherein the machine-executable instructions are further to display a convergence or divergence between current flight conditions and the flight plan.

12. The one or more tangible, non-transitory computer-readable storage media of claim 1, wherein the machine-executable instructions are to display a "land as soon as possible" warning if the nominal flight time remaining is substantially zero.

13. A method of estimating remaining battery for an electrical vertical takeoff and landing (eVTOL) aircraft, comprising:
   collecting voltage and current data from a plurality of batteries in a battery bank and disposed to provide flight power for the eVTOL aircraft;
   computing a reserve energy required to provide a reserve flight time;
   computing a flight condition-based total flight time remaining according to the voltage and current data;
   computing a usable flight time comprising the total flight time less the reserve flight time;
   and displaying the usable flight time to a pilot of the eVTOL aircraft.

14. The method of claim 13, further comprising accounting for estimated battery health of the batteries.

15. The method of claim 13, wherein the reserve flight time is selected to avoid damaging the batteries by drawing the batteries draining the batteries below a threshold state of charge.

16. The method of claim 13, wherein the reserve flight time is selected to comply with a statutory or regulatory requirement.

17. The method of claim 13, wherein the reserve flight time is between approximately 20 and 35 minutes.

18. An electric vertical takeoff and landing (eVTOL) aircraft, comprising:
   a rotary drive system;
   a power bank to power the rotary drive system, the power bank comprising a plurality of batteries;
   a pilot display; and
   a computing apparatus comprising a processor circuit and a memory, the memory having stored thereon instructions to monitor the power bank and compute a contextual nominal flight time remaining, wherein the nominal flight time remaining accounts for an aggregate status of the batteries and for a plurality of flight modes; and to display the nominal flight time remaining on the pilot display.

19. The eVTOL aircraft of claim 18, wherein the instructions are further to subtract a reserve flight time from the nominal flight time.

20. The eVTOL aircraft of claim 19, wherein the reserve flight time is selected to avoid damaging the batteries by drawing the batteries draining the batteries below a threshold state of charge and/or to conform to a statutory or regulatory requirement.

* * * * *

UNITED STATES PATENT AND TRADEMARK OFFICE
CERTIFICATE OF CORRECTION

PATENT NO. : 12,240,346 B2
APPLICATION NO. : 17/561900
DATED : March 4, 2025
INVENTOR(S) : Albert Mazzei et al.

Page 1 of 1

It is certified that error appears in the above-identified patent and that said Letters Patent is hereby corrected as shown below:

In the Claims

In Column 18, Claim 15, Lines 41-42, delete "drawing the batteries".

In Column 19, Claim 20, Line 1, delete "drawing the batteries".

Signed and Sealed this
Third Day of June, 2025

Coke Morgan Stewart
*Acting Director of the United States Patent and Trademark Office*